Dec. 15, 1953  P. H. THOMAS  2,662,726
INTERMITTENT IMPACT WATER WHEEL
Filed April 30, 1947  2 Sheets-Sheet 2
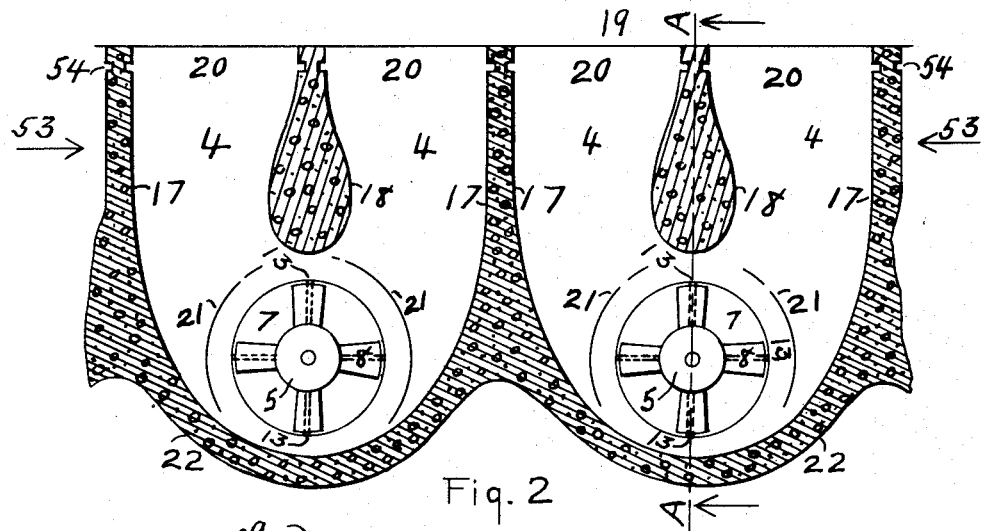
Fig. 2
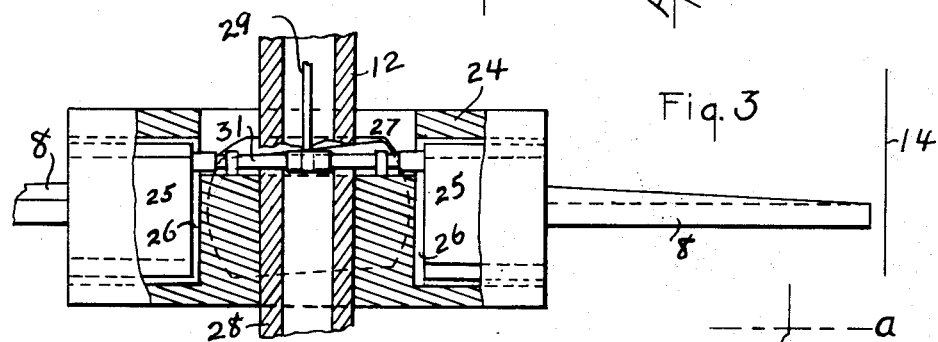
Fig. 3
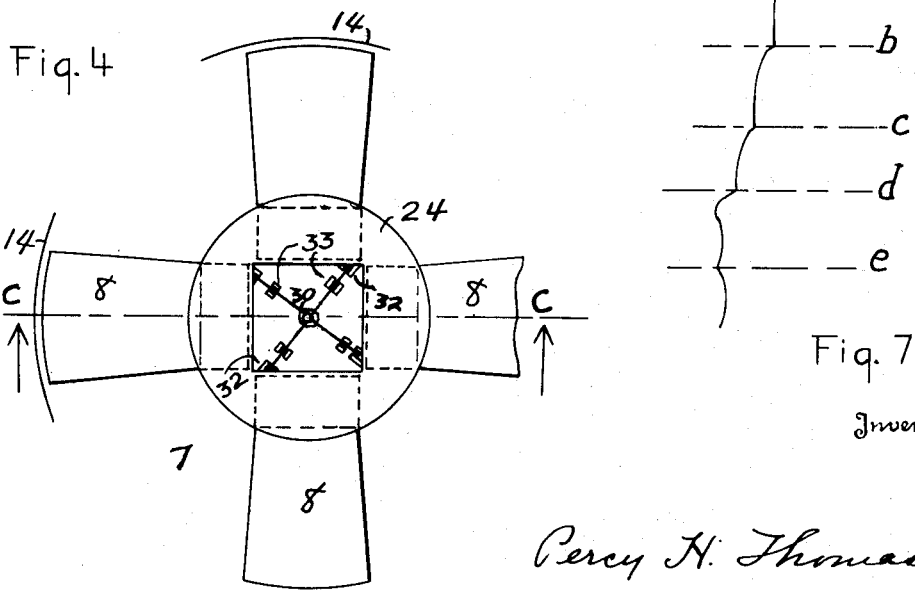
Fig. 4
Fig. 7
Inventor
Percy H. Thomas Patented Dec. 15, 1953

2,662,726

UNITED STATES PATENT OFFICE 2,662,726

INTERMITTENT IMPACT WATER WHEEL

Percy H. Thomas, Washington, D. C.

Application April 30, 1947, Serial No. 744,825

1 Claim. (Cl. 253—148)

My invention relates to water turbines, and offers a new type, characterized by very high speeds of blade rotation and by a substantially direct flow through the active portion of the water channel. The approach to the novel action is from the conception of the so-called hydraulic ram, which offers means, through impact, for the intensification of useful mechanical pressures derived from flowing water under head, beyond the amount of this head. I secure my novel operation by introducing in the hydraulic turbine the principle of intermittency, in that I permit the water column, filament by filament, to fall under its head freely between rotor blades for a certain time, and then check the falling filaments by the intervention of the revolving blade, filament by filament, and this, before any filament has time to attain an excessive velocity. By this intermittancy of flow, I am able to largely suppress all material rotational flow in the water column. At the same time I am able to extract the energy from the water with a very high degree of efficiency, by means of properly shaping and positioning the blades, as will be explained. The suppression of rotational motion greatly reduces losses.

To understand the nature of my invention, it is necessary to remember that the distance a body falls, under the influence of a steady force, such as gravity, or, indeed, the distance covered by any body, accelerating under a steady force, is proportional to the square of the time of travel, according to the formula, distance equals $\frac{1}{2} at^2$, using the usual symbols. By concentrating the blade action on any filament into a small portion of the revolution, I secure a very short period of action for each particular filament of the water column, and hence greatly limit the distances of water displacement—that is, these water filaments can be deflected transversely into rotation only very slightly. This is an important significance of the intermittency. As a further result the operation is characterized by very small rotational velocity in the water stream as a whole, and by very slight variations in axial velocity due to the passing of a blade. However, this intermittency involves very heavy pressures on the blade. This characteristic works strongly for efficiency by reducing eddy losses, which are due to movement not pressure.

The suppression of rotational velocity is further favored by the fact that the pitch of my exceptionally high speed blades is less than for the conventional type, and the rotational component of the blade reaction is therefore less, this being an element in determining the main stream rotational velocity. It will be noted that, while the reaction on any particular streamlet of water is highly intermittent, the pressure on the blade, and hence the power torque, is constant.

On account of the intermittent reaction of the blade on any particular filament of water passing in an axial fixed path in the wheel, this filament is subject to a series of successive checks while still upstream, long before it reaches the plane of blade rotation. Each check produces a corresponding pressure on the blade, resulting in a force component directed against the blade movement on account of the blade pitch, thus delivering a certain amount of power to the blade.

My novel construction is a radical departure from any type of turbine known to me, and it has correspondingly important advantages. The speed of rotation will be several times that of any of the conventional types for the same head. This means smaller dimensions for the rotor, in the water passages, and in the generator as well. The stream of water passes almost axially through the channel from the forebay to the tailrace, without important rotation and without the inter-position of auxiliary apparatus. The water stream never reaches spouting velocity. I provide regulating means for a wide range of load, by rotating the blades in unison on their radial axes so as to change the pitch. The water is delivered to the tailrace with practically no turbulance, as will be explained below. The mechanical parts of my turbine are definitely smaller and simpler than those of other types, but the blades are subjected to very heavy pressure. The operation of my turbine shows very high efficiencies on partial loads and will operate over a very wide range of head without important disadvantage, the quantity of water passed being adjusted to the head of the moment.

The operation will now be described in connection with the figures. For the purposes of this application, the following terms are here defined.

"Axial" or "longitudinal" means parallel to the axis of the water channel, which, however, may be curved, these terms excluding any motion which, in addition to an axial direction, also has a circumferential component, part or all the way through the turbine.

"Rotational" or "transverse" means around a circumference, at any radius in the circular water passage, especially near the plane of the wheel.

"Upstream" means before the water reaches the rotor.

"Downstream" means after the water leaves the rotor.

"Before" means ahead of the revolving blade in the line of its travel.

"Behind" means in the path of the blade after it passes.

"Radial" means in the direction from the center of the circular water passage directly toward its circumference.

"Relative velocity" is the velocity of the water stream with reference to the blade. In speaking of relative velocity it is usually convenient to consider the blade as stationary, and the water stream as taking a fictitious velocity and direction of motion corresponding to the relative velocity, that is to the vectorial sum of the water velocity and the blade speed, reversed.

"Absolute velocity" has its usual meaning, that is, velocity with reference to the earth, or some fixed point.

"Solidity ratio" means the ratio of the total blade area to the water channel area.

"Unobstructed," applying to a liquid carrying conduit or penstock indicates a conduit open for the free passage of liquid under the existing head without deflecting or retarding members; the term excluding guide vanes or the equivalent.

In the drawings:

Figs. 1a, 1b, 1c and 1d are diagrammatic views representing the relative size and shape of the discharge channel, tail or draft cone, and guide partitions on the respective transverse planes represented by D—D, E—E, and F—F in Fig. 1 and at the exit portal of the installation shown in Fig. 1.

Fig. 2 represents a horizontal section of the installation of Fig. 1, showing two wheels, taken along the line B—B, Fig. 1.

Fig. 3 is an elevation of my rotor as shown in Figs. 1 and 2, partly in section, along the line C—C of Fig. 4.

Fig. 4 shows a plan view of the same rotor, with four blades.

Fig. 5 shows the cross section of a rotor blade, taken near the root, suitable for use in Figs. 1 to 4; also, the relative position of two successive blades.

Fig. 5a shows a section of the blade of Fig. 5 taken near the center of the length of the blade.

Fig. 6 shows an alternative form of blade.

Fig. 7 shows the path of a slug of water as it approaches the plane of the wheel, being subjected successively to the reaction of several blades, as they pass by downstream of the slug.

Figure 1:
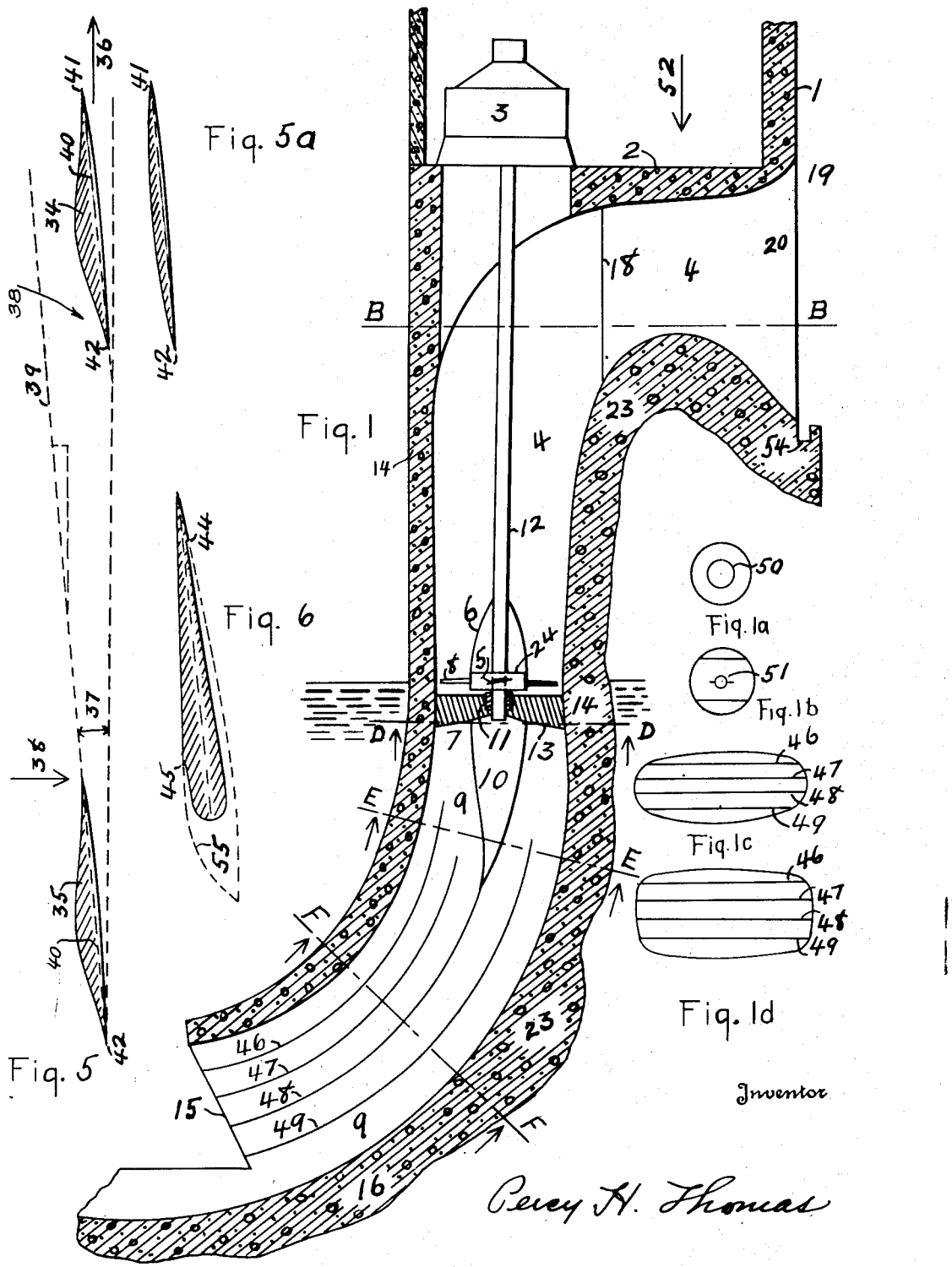
Fig. 1 represents a sectional elevation of my water wheel, installed in a medium head plant, for example, for a static head of the order of 60 feet. The section is taken on the line A—A of Fig. 2.

In Figs. 1 and 2, 1 represents the upstream face of a dam; 2, a generating room with an electric generator, 3. The passages 4, 4 are the water channels, leading to the rotors, 5, 5. The water channels, 4, 4, which, near the rotors, take the form of annuluses, 7, 7, surround the rotors. The blades, 8, 8, of the rotors extend nearly but not quite across the annuluses. The channels have a steady cross-section contraction from the entrance, to the throat, 7, located at the level of the rotor.

Below the throat 7 the discharge channel 9 gradually increases in section retaining its annulus form for a certain distance. The center of the channel 9 is occupied by the distorted cone 10, which I prefer to make of steel. Just below the rotor 5 is mounted the spider 13, which carries the guide bearing 11, and also serves to steady the turbine shaft 12. The shaft 12 carries the rotor 5 and is driven by it. The shaft 12 also drives the generator 3. I prefer to have the thrust bearing for the assembly, consisting of the shaft, rotor and generator, constituted as a part of the generator in the usual way.

To guide the oncoming waterflow and to preserve its streamline action, I cover the hub of the rotor upstream with a hood or nose 6 fast thereon shown in Fig. 1. This hood 6 is made removable and helps to cover and protect the mechanism operating in the hub.

The lower portion of the channel 9 which here becomes a tailrace has a gradually increasing section as shown, curving to conduct the discharged water downstream at the portal 15. The usual foundation is indicated at 16.

Referring more particularly to Fig. 2, I provide vertical partitions 17, 17 between adjacent water wheels, and guides 18, 18 to divide the water coming in from the forebay 19, through the openings 20, 20. All these walls, being carefully proportioned and streamlined, serve to gradually accelerate the water column on its way to the throat 7, and without important eddies. The lines 21, 21 indicate a rounded lip or threshold to smoothly guide the water into the narrow circular annuluses. At 22, 22 are the outer shells of wall forming the annulus in the approach channel 4, 4, and merging into the outer walls 14 of the discharge channels 9. I prefer to make these shells 22, 22 of concrete. They are supplementary to the main body of the dam 23, 23 which supplies the channel walls, in part. The lower part of the dam, including the portal 15 to the tail race, is broken away in Fig. 2.

Figs. 3 and 4 show the construction of my rotor 5. Fig. 3 is partly an elevation and partly a vertical section on the line C—C of Fig. 4. The rotor consists of a central cylindrical hub 24, carrying four blades, each with a tapered blade portion 8 spanning the annulus 7, but leaving a free clearance to the outer wall 14 of the annulus at the tip. The cross-section of these blades may be seen in Figs. 5 and 5a. Each blade has a root 25 which is cylindrical in shape, the top and bottom of the cylinder being cut away. The root 25 may rotate, with a good fit, in a circular recess 26 in the hub, as shown in these figures. Centrally, within the hub, is a square depression 27, communicating with the four cylindrical recesses 26 at their upper levels. The driving shaft 12 fits tightly in the hub and extends through downwardly at 28. This extension enters the lower guide bearing 11, as shown in Fig. 1. In Fig. 3, the left hand blade 8 is broken off, to permit a larger scale drawing; similarly with the right hand blade in Fig. 4.

The control of the angular position of the blade is secured as follows, all blades taking the same angle simultaneously. The shaft 12 is hollow and a rod 29 extends down through the central opening from the generating room 2 to a position registering with the square depression 27. At this level there are four equally spaced longitudinal slots 30, 30 in the shaft, through which extend four levers 31, 31, pivoted on the inner end on the rod 29. When the rod is moved up and down in the generator room, the inner ends of the levers are raised or lowered as the case may be. The outer ends of the levers 31, 31 are pivoted in clevises 32, 32, formed at one side of each of the blade roots 25, 25, at the level of the depression 27. The levers 31, 31 are hinged at other clevises 33, 33, arranged to give the desired leverage to the rod, and located fast on the floor of the depression 27. This mechanism causes movement of the rod to force the blade roots, and hence the blades proper, to take any desired angular position in the annular space. As the devices for controlling the movements of the rod are well understood and form no part of this invention, they are not here further illustrated.

To secure the highest efficiency, I provide the narrowest throat, at the location in the water channel where the rotor is placed. In order to get the necessary high water velocity, I may rely upon the suction below the blades. Since kinetic energy in the water at the throat is necessary to carry this water out of the vacuum to the discharge portal, against atmospheric pressure, I place the rotor, subjected to the maximum permissible vacuum, at the level of the minimum tailwater. About 25 feet of vacuum is suitable for many cases, this leaving a certain amount of pressure against the downstream face of the blades.

In Fig. 5, I illustrate two successive blades in their relative positions. The paths traversed, actually circular in space, are developed on a flat surface, in the figure, to better show the action. The leading blade 34 and the trailing blade 35 are moving to the right as shown by the arrow 36, each blade having a certain pitch, the pitch angle being shown as 37. The water column is moving in the direction shown by the arrows 38, 38. The resultant or "relative" direction of the water with relation to the blade 34 is shown by the dotted line 39.

The blade 34 is shown in cross-section, the dotted line 40, within the section, being the pitch line. The lower cross-section boundary is nearly a straight line, so shaped to permit the water just below the blade to pass axially at close to normal speed, so that there will not be any undue tendency for the water to leave the blade surface. As here laid out, there is a high vacuum at this point in the channel.

In some cases I prefer to maintain the highest feasible vacuum at the throat, approaching the barometric height. The advantage lies in the higher water velocity at the throat, which means smaller throat area and less pressure on the blades. This is numerically of real advantage. In this case I so shape the nose of the blade that it forcibly separates the water stream, giving the downstream cut-off portion a slight increase in velocity. It is thus caused to leave contact with the blade surface on the downstream side, which contact is not renewed. By this means, I prevent slapping of the water on the metal surface and consequent corrosion. It also eliminates a certain amount of friction. To implement this action, I provide a sharp edge on the under surface of the blade, transverse to the direction of the relative velocity, shown at 44, Fig. 6, to make sharp the point of separation.

There will result from this action, a small vacuum space, or cavity, 55, Fig. 6, following behind the blade, this cavity moving with the blade, but never completely closing. The water maintains its contact with the blade on the upstream side over the whole prescribed blade width, and then leaves the surface as on the downstream side, there being another sharp transverse edge 45 provided as shown in Fig. 6. The water boundaries of the cavity 55 are shown dotted in Fig. 6. The water passing upstream of the blade will be drawn to that passing downstream, after the passing of the blade, by the vacuum, presumably forming a slight vortex at the closing point, due to the differences in velocities.

One advantage of this cavity is the space to give the blade a greater cross-section for strength, and to make the upstream surface nearly flat instead of convex, as shown in Fig. 5. In the blade of Fig. 5, the nose 41 and the trailing edge 42 are sharp to favor streamline flow, the latter also reducing the losses behind the blade. The thickness of the blade shown in Fig. 5, becomes less at the middle of the blade as shown in Fig. 5a, and becomes a thin edge at the end of the blade.

It will be noted that the different points on the blade along the radius move at different velocities. I compensate for this difference, by changing the pitch of the blade along the radius correspondingly, greater pitch near the root.

When the water stream passes the rotor and enters the channel 9 it has a high velocity and is under a suction. To recover the kinetic energy and eject the water from the channel against the pressure of the atmosphere, I provide a gradually increasing section for the water stream so that it will lose its velocity slowly, as is well understood, and develop the corresponding increase of pressure appropriate to the amount of the suction with which it left the rotor. While increasing section discharge channels are well known, I show a special, novel arrangement, which has marked advantages. By means of the distorted cone 10, Fig. 1, I gradually change the annulus at the rotor into a cylindrical form, as shown in the sketch Fig. 1b, this being a section taken on the line E—E of Fig. 1. The condition at the section on the line D—D, at the annulus, is seen in the sketch Fig. 1a. Beyond this line E—E the circular section becomes flattened, approaching an ellipse, as shown in the sketch Fig. 1c, taken at the line F—F. I prefer to curve the discharge passage 9 to the left, as shown in Fig. 1, to permit the discharge of the water down river. To prevent undue eddies from this deflection of the water, I provide partitions, preferably of steel, dividing the channel horizontally along the channel 9 as shown at 46, 47, 48, and 49 in Fig. 1c. The same partitions are continued to the portal 15, as seen in the sketch Fig. 1d. The diminishing size of the distorted cone 10 is seen at 50 and 51, in the sketches Fig. 1a and Fig. 1b. By this means I so reduce the relation of the depth to the radius in the several subdivisions of the discharge channel 9 that no material eddy loss occurs from the curve. At the same time, I provide an exceedingly economical construction, requiring excavation of a minimum depth.

In adapting my turbine to a site where the head is higher, but the quantity of water the same, I merely strengthen the blades and leave other elements the same, for the tail water conditions are unaltered. In an extreme case it might be desirable to speed up the blades, or increase their number without changing the solidity ratio, to prevent undue acceleration of the free water columns during the intervals between blade passages.

The operation of my turbine may be explained in detail as follows: On the opening of the control gates, the water from the forebay 19 enters the water passages 4, 4 and flows down through the throat 7 and the rotor 5, into the water passage 9, and out the discharge opening 15 to the tail race. I have not illustrated the control gate as the construction of such gates is well known. Control gates may be placed, favorably, in line with the arrow 52, Fig. 1, and the arrows 53, 53, Fig. 2. Stop logs, positioned in the slots 54, 54 may be used to dewater the rotor. The rotor may be hoisted to the generating room 2 by removing the generator 3.

The blades being set with a certain pitch, the impact of the water starts rotation and the rotor comes up to speed. In some cases I may temporarily increase the blade pitch angle in starting to increase the torque before conditions are steady. I may, if desired, start the rotor and generator mechanically or electrically through the generator, as is well understood, to relieve the shock on the rotor blades before the water channel is filled. It is held at the desired speed either by a speed governor, as is well known, or by synchronizing the generator with a regulated power system. This rotor speed may be much higher than the spouting speed of the water under the existing head, the speed being variable at will, as a matter of design, without greatly affecting the efficiency. At the same time, the maximum axial velocity of the water will be far below this spouting velocity. As the blade, at the pitch angle, moves around and around the annulus, it fixes the downward velocity of the water stream, much as a screw material conveyor moves material forward. The downward velocity of the water is determined by the pitch of the blade and the blade speed.

When the blade has once passed, the water column is free to fall unhindered under the static head as it then exists, passing down between two blades. Due to the very high blade speed, the time during which the water can thus accelerate, before the next blade arrives to stop acceleration, is very short, with the result that in a properly designed turbine, this acceleration is negligible, as far as the amount of water escaping is concerned. This intermittent action, with its brief intervals, is an important part of my invention, for the result is the limiting of the velocity of stream flow to approximately that determined by the pitch and the blade speed. By rotating the blades 8 in the hubs 24 by means of the rod 29 I can control the amount of water passing and hence the power developed. Intermittent action is important also because the cross-section of the channel need not be increased as the energy is taken from the water. The free spaces act as by-passes, giving any appropriate velocity to the water.

In a design with a four blade rotor, revolving at 12 R. P. S., the interval between blades is $\frac{1}{48}$ sec. During such an interval the water column could fall only .007 ft. Thus the stream flow in this case is at substantially constant velocity, as a whole, determined by the pitch and the blade speed. The speed being very high, the pitch will be low, and the component of the blade reaction on the water column will have a relatively small component of transverse force, and a small tendency to cause rotational flow. I usually prefer to have the solidity ratio in my turbine less than one-half; it may be much less. However, it may be necessary, in other cases, to make it somewhat greater.

The novel and characteristic effect of the increased width of the isolating spaces between the blades and the several times higher rotational speed of the blades, as compared with conventional hydraulic turbines, is well illustrated by considering the example hereinafter referred to wherein the solidity ratio is 4/10 and the rotational speed as determined by the pitch of the blades and velocity of stream flow is assumed to be three times that of the conventional turbine. Bearing in mind that the "swirl," or tangential rotation normally set up in the water column due to the backward reaction on the moving water of the useful torque impressed on the blades, is a characteristic feature of the operation of such turbines, the absence of such a swirl in my water wheel is indicative of the fundamental difference between it and turbines as heretofore constructed. To illustrate, it is obvious that the distance of actual water travel in the swirl in the normal propeller type turbine (as determined from the expression $S=\frac{1}{2}at^2$) will be much greater than that produced in my type of wheel, first, because the blade is narrower on account of the low solidity ratio (the isolating by-pass spaces being here taken as 4/10), and second, because the conventional turbine blade speed is only a fraction of that of my wheel (in this case taken as 1/3). Since the distance travelled by the water in the swirl is proportional to the square of the time, this distance in the conventional turbine will be $(3/.4)^2=57$ times that in my wheel in the example given. It is thus clear why conventional designers employ the stationary guide vanes to give an initial backward swirl to the water, to overcome the swirl due to the torque force, and to have the water leave the wheel without swirl, whereas my wheel needs no guide vanes as the small backward movement of the water expends its velocity in local eddies at each blade.

The unit pressure on the blade will exceed the unit static head by the solidity factor, that is the ratio of the total blade width to the circumference of the circle of rotation. This follows from the fact that all the momentum accumulated by the falling water column between blades is delivered to the next blade as it intercepts the water stream. This delivery is cushioned by the transverse displacement of water upstream from the face of the blade.

If the static head be H, the area of the blades A, the ratio of the annulus area to the blade area r, the pitch angle t, and the blade speed v, the pressure on the blade is HAr. The component of force in the direction of blade motion is HAr tan t, and the output is HArv tan t. The expression Arv tan t is the total volume of water passed per unit of time and H is the head, so that their product gives the energy available. The efficiency is 100%, assuming no losses.

The very heavy pressure of the blade is impressed on the water in all directions and tends to cause a flow of water across both the upstream and downstream faces of the blade, pressure on the upstream side and suction on the downstream side. The result is the tendency to force a short slug of water around from the pressure side to the suction side over the trailing edge. By the same reasoning already given in connection with the effect of the high speed and intermittency in preventing any but a very slight flow vertically between blades, it is seen that a very definite, but very limited flow, will occur around the trailing edge. This will be enough to account for the very heavy stresses on which the transfer of power from water to blade is secured in my turbine. As a matter of fact, the distance that a slug of water would move in the case cited above in the $\frac{1}{120}$ sec. taken for the blade to pass is less than $\frac{1}{10}$ of a ft. The solidity ratio is here taken as $\frac{4}{10}$. This short flow extends well upstream and downstream of the blade, as a result of the very high pressure and the slight transverse motion, as is necessary to permit the total water displacement caused by the passing blade.

All this flow will be streamline, proceeding smoothly and progressively from one point to another, the motion of any one filament of water paving the way for the similar movement of the next filament.

Consider a slug of water approaching the rotor from upstream, but some distance away. As a blade passes at some distance downstream, the slug feels a check from the reaction of the blade. The effect will be to slow down the slug and transfer some energy to the blade, since the blade is moving under the influence of the force; pressure on a moving body in the direction of motion must pass energy. This slug will also experience a certain component of force in a backward rotational direction, causing a deflection in its path. As the blade passes, the slug would naturally continue at the checked velocity in the new direction, but as a matter of fact it cannot do so, for it is enclosed in a moving stream of water of unlimited extent which cannot be stopped. The result is that the velocity will be restored to the slug, approximately, and its direction largely straightened out, leaving only a residual effect on the column as a whole. Whatever momentum and energy changes took place in the slug are later largely distributed through the whole stream, in the interval between blades.

When a second blade passes this slug of water downstream, a similar effect is produced, somewhat more severe than the first, and so on. The suction effect, already mentioned, does not appear until the slug of water passes the plane of rotation. Thus the extraction of power from the water and its delivery to the blade is an intermittent process in my turbine, one beneficial result being the substantially complete suppression of the rotational component of stream motion, that is the cause of so much difficulty in the conventional turbine.

The effective axial velocity of my water stream is the average of the velocity taken over the whole annulus, including both the velocities where established by the blade, and that between blades. This will, however, differ little from that due to the blade pitch and blade speed, unless it be in special cases where it is desired to use relatively low speeds and wide blade spacings.

The body of water that is momentarily checked upstream by the passage of a blade, has roughly the shape of a wedge with its wide end upstream. This wedge follows the blade as it rotates, affecting one stream filament after another. On account of the expanding dimensions of the wedge upstream, its checking effect will extend beyond the end of the blade, upstream, to the channel wall and check filaments of water that would naturally pass outside the blades altogether with a steady flow. On this account, I may leave wide clearances at the ends of the blade without the loss of a material leakage of water over the end. The expanding angle of this wedge may be approximated by taking the arc tangent, ratio of the speed of sound in water to the speed of the reaction forced by the passing blade on the water stream in virtue of its pitch and its speed, and considering this as one-half of the wedge angle.

A wedge of suction reaction from the blade exists downstream, much the same as that extending upstream. This downstream wedge and the accompanying suction serve to extract energy from the water after it has passed the plane of the rotor in virtue of the component of the suction on the blades in the direction of rotation.

In cases where it is desired to reduce the blade speed to a minimum, or to increase the space between blades, and still retain the advantages of my invention, I propose to shape the blade cross-section to compensate for the new condition, with the increased acceleration of the water column between blade passages. I shape the camber line of the blade, that is, its curvature, so that the camber line angle at the nose corresponds to the angle of the relative velocity of the water, and the angle of the camber line at the trailing edge corresponds to the angle of discharge of the water stream, which will give the desired average water stream velocity around the annulus. This must be determined by the designer, to give the desired output. By "camber line" I mean the mean line of the section of the blade which determines the net effect of the blade on the direction of the stream flow in passing the blade. While the velocity variations in the water column, axial and transverse, will be greater than with the higher blade velocity, they will still be streamline and the result will still be very favorable.

My novel turbine has one important advantage in cases where it is necessary to use the same structure as a pump; or sometimes as a turbine and sometimes as a pump; for it is necessary merely to give the blades of my rotor 5 a negative pitch, for the flow of water to be reversed, entering from the portal 15, and discharging through the "entrances" 20. This results in a change from the turbine operation into a pump operation. In this case the pressure of the head of water remains on the same face of the blade and the suction on the same face as with turbine operation, but the axial direction of the water flow is reversed. The passage of the blade gives the neighboring streamlets an upward impulse which is somewhat slowed by gravity between blade passages. As with the turbine, a small quantity of water is forced around the trailing edge to cushion the shock of the oncoming blade on the water filaments. The vacuum below the blades accelerates the water entering the passage 9 through the portal 15. In this operation power must be supplied, which may be accomplished through the generator 3, acting as a motor. No modification of the construction is required, provided clearance enough is given in the recesses 26, to permit the rod 29 to produce a negative pitch on the blades 8.

In case it is necessary for the generator 3 to "float" on the circuit which it is supplying with power, as is often the case, the blades should be set at zero pitch, in which case only a negligible quantity of water will be passed. The unit is then ready to supply power, momentarily, by the mere setting of the pitch to the appropriate value.

In my turbine, the designer has many factors that he may vary to meet various conditions of service and still get the benefits of my invention, such as the diameter, width and area of the annulus, the speed of rotation and the number, width and spacing of the blades. He has an unusually free choice because the output depends directly on the static head, the area of the annulus at the rotor and the velocity of the water at that point, leaving the other design conditions free.

While I have described my invention with reference to certain particular embodiments, I expect it to be used to great advantage in a wide variety of situations. My principal novel features, involving the impact action, the blade speed above spouting velocity, the intermittent action and the direct passage of the water through the channel, without the conventional rotational motion, and at low velocity, give the designer unique opportunities for efficiency.

I claim as my invention:

The method of interchanging hydraulic and mechanical energy which consists in axially projecting a stream of water on a rotating element moving at a greater peripheral speed than the velocity of said stream and at a small angle to a plane transverse to said stream while maintaining a low pressure on the under side of said element to produce a useful torque in a direction transverse to said stream by impact, suppressing the tendency of the torque reaction to produce reverse rotation in said stream by making the impact action rapidly intermittent and timing the intervals between successive impacts of a filament of water so that each incipient rotational motion of the filament is suppressed by momentarily permitting free axial movement of adjacent filaments, thereby causing each repetition of the impact action of a filament to start substantially without rotation of said filament around the axis of said rotating element.

PERCY H. THOMAS.

References Cited in the file of this patent

UNITED STATES PATENTS

| Number | Name | Date |
|---|---|---|
| 1,485,186 | Harza | Feb. 26, 1924 |
| 1,497,723 | Huguenin | June 17, 1924 |
| 1,504,776 | Nagler | Aug. 12, 1924 |
| 1,562,556 | Harza | Nov. 24, 1925 |
| 1,606,887 | Moody | Nov. 16, 1926 |
| 1,748,892 | Nagler | Feb. 25, 1930 |
| 1,751,667 | Taylor | Mar. 25, 1930 |
| 2,054,142 | Sharp | Sept. 15, 1936 |
| 2,079,258 | Kerr | May 4, 1937 |
| 2,079,766 | Jessop et al. | May 11, 1937 |

FOREIGN PATENTS

| Number | Country | Date |
|---|---|---|
| 5,134 | Great Britain | 1903 |